US006910470B2

(12) United States Patent
Blumenstock et al.

(10) Patent No.: US 6,910,470 B2
(45) Date of Patent: Jun. 28, 2005

(54) METHOD FOR OPERATING AN INTERNAL COMBUSTION ENGINE ESPECIALLY OF A MOTOR VEHICLE

(75) Inventors: Andreas Blumenstock, Ludwigsburg (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/475,224
(22) PCT Filed: Apr. 4, 2002
(86) PCT No.: PCT/DE02/01233
§ 371 (c)(1),
(2), (4) Date: Apr. 2, 2004
(87) PCT Pub. No.: WO02/084094
PCT Pub. Date: Oct. 24, 2002

(65) Prior Publication Data
US 2004/0154585 A1 Aug. 12, 2004

(30) Foreign Application Priority Data
Apr. 18, 2001 (DE) .......................................... 101 18 878

(51) Int. Cl.⁷ ................................................ F02B 47/08
(52) U.S. Cl. ............................. 123/568.11; 123/568.21
(58) Field of Search ........................ 123/568.11, 568.19, 123/568.21

(56) References Cited

U.S. PATENT DOCUMENTS

| | | | |
|---|---|---|---|
| 4,224,912 A | * 9/1980 | Tanaka | 123/568.19 |
| 5,201,173 A | 4/1993 | Fujimoto et al. | |
| 5,540,091 A | * 7/1996 | Nakagawa | 73/117.3 |
| 5,570,673 A | 11/1996 | Isobe | |
| 6,032,753 A | 3/2000 | Yamazaki et al. | |
| 6,044,826 A | * 4/2000 | Bayerle et al. | 123/568.16 |
| 6,202,624 B1 | 3/2001 | Stuerz et al. | |
| 6,209,313 B1 | 4/2001 | Wissler et al. | |
| 6,347,513 B2 | 2/2002 | Pfleger et al. | |

FOREIGN PATENT DOCUMENTS

| | | |
|---|---|---|
| DE | 4216044 | * 11/1993 |
| DE | 198 48 990 | 4/2000 |
| EP | 0904971 | 3/1999 |
| EP | 1004760 | 5/2000 |

\* cited by examiner

Primary Examiner—Mahmoud Gimie
(74) Attorney, Agent, or Firm—Walter Ottesen

(57) ABSTRACT

A method for operating an internal combustion engine (1), especially of a motor vehicle, is described. Air and fuel are supplied to a combustion chamber (4) of the internal combustion engine (1) and exhaust gas is recirculated to the combustion chamber (4). The exhaust gas is recirculated to the combustion chamber (4) during overrun operation of the internal combustion engine (1).

14 Claims, 2 Drawing Sheets

METHOD FOR OPERATING AN INTERNAL COMBUSTION ENGINE ESPECIALLY OF A MOTOR VEHICLE

This is the U.S. national stage of International Application PCT/DE02/01233, filed Apr. 4, 2002, designating the United States.

FIELD OF THE INVENTION

The invention proceeds from a method for operating an internal combustion engine, especially of a motor vehicle, wherein air and fuel are supplied to a combustion chamber and wherein exhaust gas is fed back to the combustion chamber. The invention relates likewise to a corresponding internal combustion engine as well as a control apparatus for an internal combustion engine of this type.

BACKGROUND OF THE INVENTION

A method of the above kind, an internal combustion engine of the above kind and a control apparatus of the above kind are generally known from internal combustion engines having exhaust-gas recirculation, for example, from a so-called gasoline-direct injection or a so-called diesel direct injection or also from a so-called intake manifold injection, each having exhaust-gas recirculation.

In these internal combustion engines, a catalytic converter is provided for purifying the toxic substances arising with the combustion of the fuel. The catalytic converter is, for example, a so-called three-way catalytic converter or an NOx storage catalytic converter or an oxidation catalytic converter. These catalytic converters require a specific temperature, for example approximately 300° C., for an optimal operation.

A possible operating mode of the internal combustion engine is the so-called overrun operation which is better characterized as a push operation since the internal combustion engine generates no torque in overrun operation; instead, the engine is driven by the rolling motor vehicle. In overrun operation, no fuel is supplied to the engine although the rpm of the engine is greater than the idle rpm.

For overrun phases which are longer in time, there is the possibility that the catalytic converter slowly cools and moves out of its work range. This results because, in overrun operation, no combustion of fuel takes place and therefore no new hot exhaust gas arises. The cooling out of the catalytic converter has, however, the consequence that the exhaust gases in engine operation after an overrun phase can initially no longer be optimally purified.

SUMMARY OF THE INVENTION

It is an object of the invention to provide a method wherein the catalytic converter is in the position to purify the exhaust gas as optimally as possible even after a longer overrun phase.

This task is solved with a method of the above-mentioned kind in accordance with the invention in that the exhaust-gas is fed back to the combustion chamber in an overrun operation of the engine. The task is solved correspondingly in accordance with the invention in an internal combustion engine and a control apparatus of the kind mentioned above.

With the recirculation of exhaust gas during overrun operation, it is achieved that the hot exhaust gas does not completely leave the internal combustion engine; rather, the exhaust gas at least partially forms a loop in the internal combustion engine. In this way, the temperature of the exhaust gas within the internal combustion engine becomes less only slowly even though no new hot exhaust gas is added because of the missing combustion of fuel in overrun operation. The temperature of the catalytic converter therefore is substantially maintained and the catalytic converter does not cool or at least does not cool out so rapidly.

In an advantageous embodiment of the invention, less air is supplied to the combustion chamber during overrun operation. In this way, cool fresh air is prevented from reaching the combustion chamber of the internal combustion engine which would have the consequence of reducing the temperature, inter alia, of the exhaust gas. In this way, it is achieved that the temperature of the exhaust gas present is at least not so reduced that the catalytic converter is cooled out. If required, no additional air can be supplied to the combustion chamber in overrun operation.

In overrun operation, the rpm of the engine is greater than the idle rpm. Furthermore, in overrun operation, the engine is coupled force-tight to a drive wheel especially of the motor vehicle. Likewise, no fuel is supplied to the combustion chamber of the engine in overrun operation.

It is especially practical to check whether the engine is in overrun operation and/or whether the temperature of the catalytic converter of the engine is less than a lower temperature of the work range of the catalytic converter.

Likewise, it is especially practical when the exhaust gas is only recirculated when the overrun operation is present and when the temperature of the catalytic converter is less than the lower temperature. Correspondingly, it is practical if the air is only then not supplied when the overrun operation is present and when the temperature of the catalytic converter is less than the lower temperature.

Of special significance is the realization of the method of the invention in the form of a computer program which is provided for the control apparatus of the internal combustion engine. The computer program can be run on a computer of the control apparatus and is suitable for executing the method of the invention. In this case, the invention is therefore realized by the computer program so that this computer program defines the invention in the same way as the method which the computer program is suitable to execute. The computer program can preferably be stored on a flash memory. As a computer, a microprocessor can preferably be present.

Additional features, application possibilities and advantages of the invention result from the following description of the embodiments of the invention which are illustrated in the figures of the drawing. All described or illustrated features for themselves and in any desired combination form the subject matter of the invention independently of their summary in the patent claims or their dependency as well as independently of their formulation or illustration in the description or in the drawing.

DESCRIPTION OF THE PREFERRED EMBODIMENTS OF THE INVENTION

Figure 1:
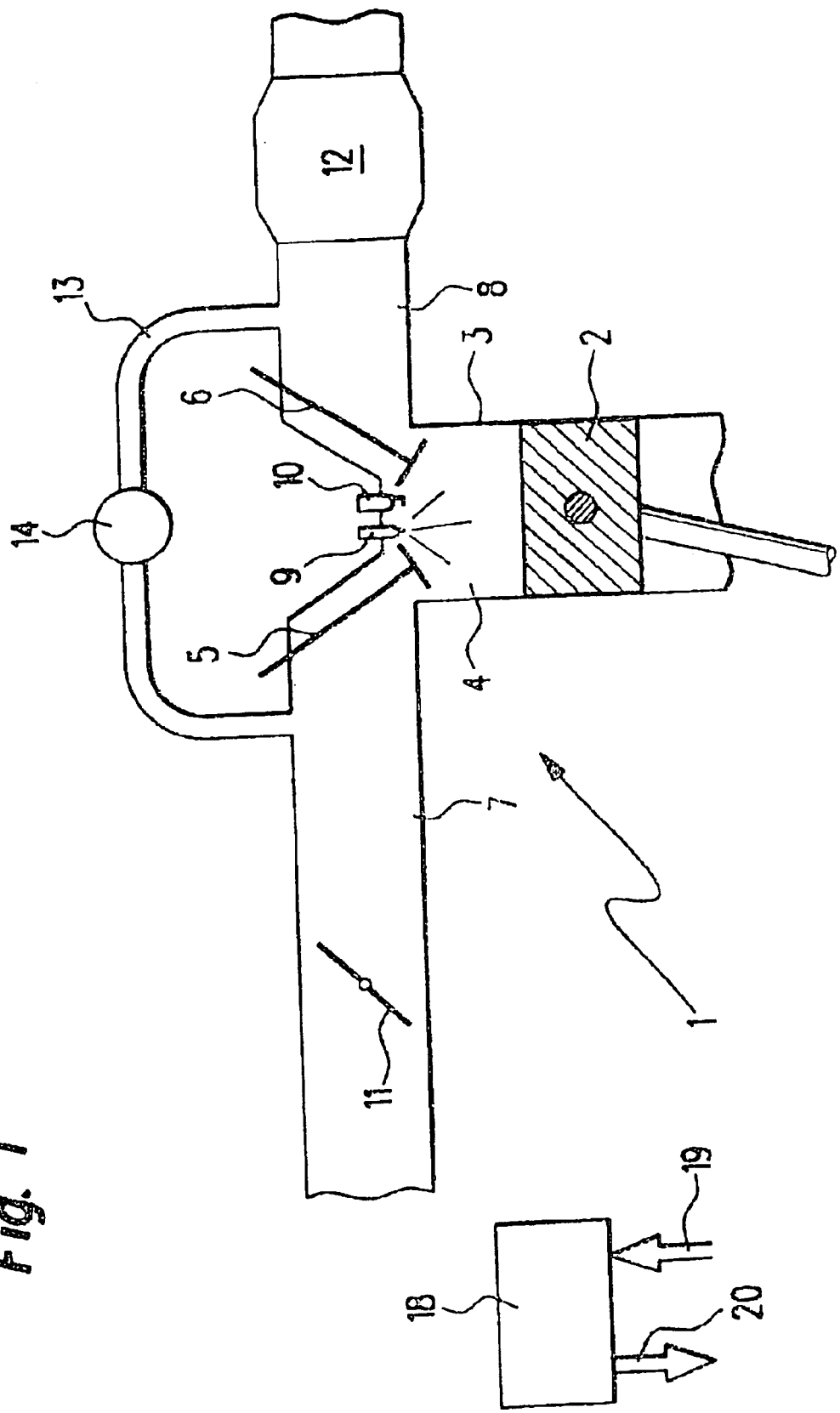
FIG. 1 shows a schematic block circuit diagram of an embodiment of the internal combustion engine of the invention; and, FIG. 2 shows a schematic block circuit diagram of an embodiment of the method of the invention for operating the internal combustion engine of FIG. 1.

In FIG. 1, an internal combustion engine 1 of a motor vehicle is shown wherein a piston 2 is movable back and forth in a cylinder 3. The cylinder 3 is provided with a combustion chamber 4 which, inter alia, is delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited by the spark plug 10.

A rotatable throttle flap 11 is accommodated in the intake manifold 7 and air can be supplied to the intake manifold 7 via this throttle flap. The quantity of the supplied air is dependent upon the angular position of the throttle flap 11. A catalytic converter 12 is accommodated in the exhaust-gas pipe 8 and functions to purify the exhaust gas arising because of the combustion of the fuel.

An exhaust-gas recirculation pipe 13 leads from the exhaust-gas pipe 8 back to the intake manifold 7. An exhaust-gas recirculation valve 14 is accommodated in the exhaust-gas recirculation pipe 13. With the valve 14, the quantity of exhaust gas, which is recirculated into the intake manifold 7, can be adjusted. The exhaust-gas recirculation pipe 13 and the exhaust-gas recirculation valve 14 form a so-called exhaust-gas recirculation.

A back and forth movement is imparted to the piston 2 because of the combustion of the fuel in the combustion chamber 4. This back and forth movement is transmitted to a crankshaft (not shown) and applies a torque to the crankshaft.

Input signals 19 are applied to a control apparatus 18 and these signals define operating variables of the engine 1 measured by means of sensors. For example, the control apparatus 18 is connected to an air-mass sensor, a lambda sensor, an rpm sensor and the like. Furthermore, the control apparatus 18 is connected to an accelerator pedal sensor which generates a signal which indicates the position of the accelerator pedal, which is actuated by a driver, and therefore indicates the requested torque. The control apparatus 18 generates output signals 20 with which the behavior of the engine 1 can be influenced via actuators or positioning devices. For example, the control apparatus 18 is connected to the injection valve 9, the spark plug 10 and the throttle flap 11 and the like and generates the signals required for driving the latter.

The control apparatus 18 is, inter alia, provided to control (open loop and/or closed loop) the operating variables of the engine 1. For example, the fuel mass, which is injected by the injection valve 9 into the combustion chamber 4, is controlled (open loop and/or closed loop) by the control apparatus 18 especially in view of a reduced fuel consumption and/or a low development of toxic substances. For this purpose, the control apparatus 18 is provided with a microprocessor which has a program stored in a memory medium, especially in a flash memory, and this program is suitable for executing the above-mentioned control (open loop and/or closed loop).

The internal combustion engine 1 of FIG. 1 can be operated in a number of operating modes. Accordingly, it is possible to operate the internal combustion engine 1 in a homogeneous operation, a stratified operation, a homogeneous lean operation, a stratified operation with a homogeneous base charge and the like.

In homogeneous operation, the fuel is injected directly into the combustion chamber 4 of the engine 1 by the injection valve 9 during the induction phase. The fuel is thereby substantially swirled up to ignition so that an essentially homogeneous air/fuel mixture develops in the combustion chamber 4. The torque to be generated is essentially adjusted by the control apparatus 18 essentially via the position of the throttle flap 11. In homogeneous operation, the operating variables of the engine 1 are so controlled (open loop and/or closed loop) that lambda is equal to one. The homogeneous operation is especially used at full load.

The homogeneous lean operation corresponds substantially to the homogeneous operation but the lambda is adjusted to a value greater than one.

In stratified operation, the fuel is injected directly into the combustion chamber of the engine 1 by the injection valve 9 during the compression phase and as close as possible into the region of the spark plug 10. Therefore, with the ignition by the spark plug 10, no homogeneous mixture is present in the combustion chamber 4; instead, there is a fuel stratification. Except for requests such as exhaust-gas recirculation, the throttle flap 11 can be completely open and the engine 1 can thereby be operated dethrottled. The torque to be generated is adjusted in stratified operation substantially via the fuel mass. With the stratified operation, the internal combustion engine 1 can be operated especially in idle and at part load.

In dependence upon the operating variables of the internal combustion engine 1, there can be a switchover back and forth between the so-called operating modes. Such switchovers are carried out by the control apparatus 18. For this purpose, an operating mode characteristic field is present in the control apparatus 18 in which a corresponding operating mode is stored for each operating point of the engine 1.

As a further operating mode, the engine 1 can be operated in overrun operation or, better, in push operation. This push operation is present when: the accelerator pedal is in a non-actuated state; the internal combustion engine 1 is not at idle; no fuel is injected into the combustion chamber 4 of the engine 1; and, when the engine 1 is clutch-engaged, that is, when the piston 2 is essentially force-tightly coupled to the drive wheels of the motor vehicle.

The push operation is, for example, present when the motor vehicle travels down a path falling in elevation. In this case, the clutch-engaged engine 1 continues to be driven by the motor vehicle rolling down the mountain without the driver actuating the accelerator pedal and without fuel being injected into the internal combustion engine 1.

During push operation, especially in longer overrun phases, the catalytic converter 12 slowly cools out. This is a consequence of the missing combustions in the combustion chamber 4 of the engine 1 during the overrun operation and of the missing hot exhaust gases.

The catalytic converter 12 has a temperature-dependent operating range wherein it operates optimally. If the catalytic converter 12 is, for example, an NOx storage catalytic converter, then this operating range lies at approximately 250° C. up to approximately 450° C. In an oxidation catalytic converter, the temperature should lie above approximately 300° C.

With the cooling out of the catalytic converter 12 in push operation, it is possible that there is a move out of the operating range of the catalytic converter 12 because the temperature of the catalytic converter 12 becomes too low. This is avoided with the method described hereinafter.

Figure 2:
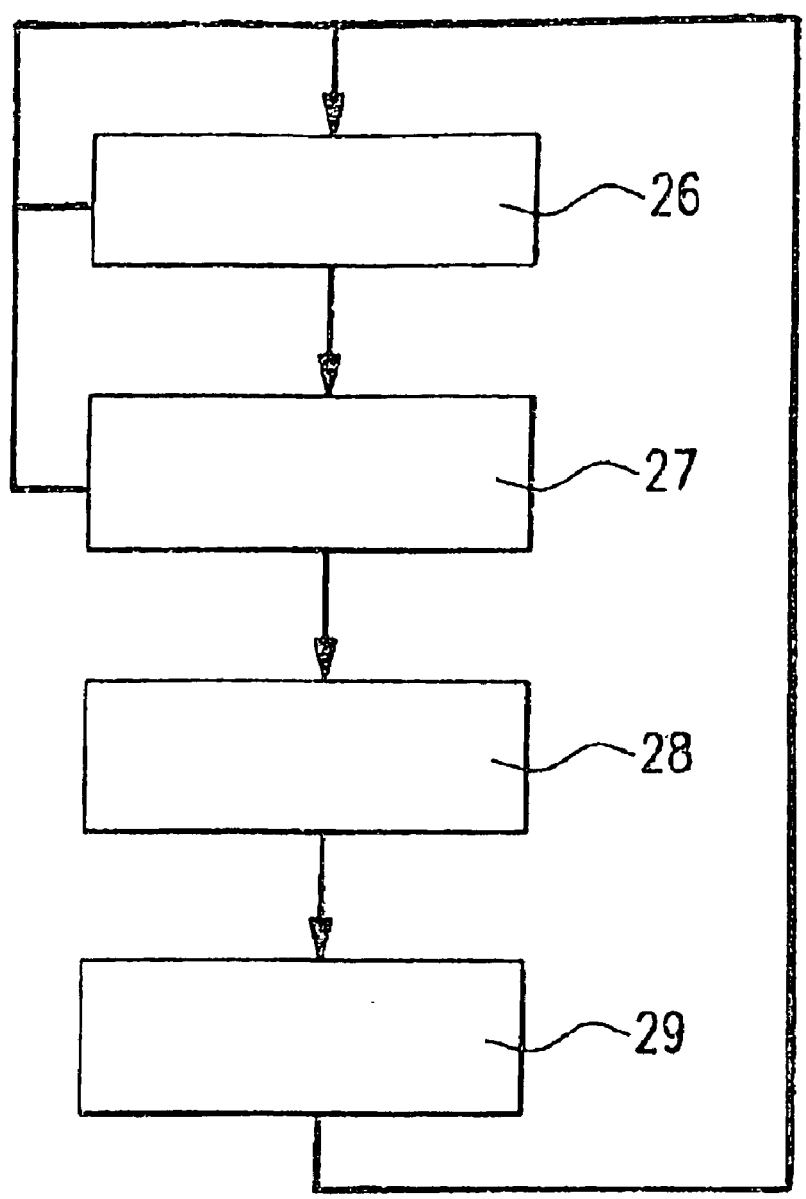

In FIG. 2, a method is shown with which the cooling out of the catalytic converter 12 during push operation is avoided. The method is carried out by the control apparatus 18.

In a step 26 of FIG. 2, a check is made as to whether the engine 1 is in a push operation. For this purpose, a plurality of operating variables of the engine 1 can be enquired of, especially, the position of the accelerator pedal, the rpm of the engine 1, the fuel mass injected into the combustion chamber 4 or the like.

If, in step 26, it is recognized that no push operation is present, then the method is ended. The method can then be carried out anew after a pregiven time duration.

If, in step 26, a push operation is recognized, then in a next step 27, a check is made as to whether the temperature of the catalytic converter 12 is in its operating range. This can be undertaken with the aid of a temperature sensor which detects the temperature of the catalytic converter 12. Likewise, the temperature of the catalytic converter 12 can be simulated with the aid of modeling and can be detected in this way. Furthermore, the operating range of the catalytic converter 12 can be pregiven by one or several threshold values to which the temperature of the catalytic converter 12 is compared. The lower temperature of the operating range of the catalytic converter 12 can, for example, be assigned a threshold value which is slightly greater than this lower temperature so that the method of FIG. 2 already intervenes before the temperature of the catalytic converter 12 leaves the operating range.

If the temperature of the catalytic converter 12 is in its operating range, then the method is ended. After a pregiven time duration, the method can be carried out anew.

If, however, it is detected that the catalytic converter 12 is no longer in its operating range, then this means that the catalytic converter 12 is already cooled out or that the temperature of the catalytic converter 12 is just at the point to leave the operating range of the catalytic converter 12.

The exhaust-gas recirculation valve 14 is opened in a next step 28 and especially completely. Furthermore, in a next step 29, the throttle flap 11 is further closed.

Because of the further closed throttle flap, it is achieved that less cool fresh air is supplied to the engine 1 and therewith to the catalytic converter 12. Furthermore, because of the opened exhaust-gas recirculation valve 14, a loop of exhaust gas is formed within the internal combustion engine 1. The hot exhaust gas is at least partially recirculated into the intake manifold 7 via the exhaust-gas recirculation in order to there again reach the exhaust-gas pipe 8 via the combustion chamber 4. Accordingly, only a portion of the hot exhaust gas leaves the internal combustion engine 1.

With the reduction of the cool fresh air as well as with the described loop of hot exhaust gas, it is achieved that the temperature of the exhaust gas in the exhaust-gas pipe 8 does not drop or at least does not drop so rapidly. This is equivalent to the temperature of the catalytic converter 12 not falling or at least falling only very slowly. The cooling out of the catalytic converter 12 is thereby avoided. It is especially avoided that the temperature of the catalytic converter 12 leaves the operating range thereof.

As soon as the push operation is ended and/or as soon as the temperature of the catalytic converter 12 is again within the wanted operating range, the method is ended. The throttle flap 11 and the exhaust-gas recirculation valve 14 are again operated in correspondence to the particular operating state of the engine 1, that is, in dependence upon the homogeneous operation or the stratified operation or the like.

What is claimed is:

1. A method for operating an internal combustion engine including an internal combustion engine of a motor vehicle, the method comprising the steps of:
    (a) providing a catalytic converter which receives exhaust gases from said combustion engine;
    (b) supplying air and fuel to a combustion chamber of said engine;
    (c) recirculating the exhaust gas into the combustion chamber during overrun or push operation of said internal combustion engine; and
    (d) reducing the air supplied to said combustion chamber during overrun or push operation, so that a cooling out of said catalytic converter is substantially reversed or avoided via steps (c) and/or (d).

2. The method of claim 1, wherein, in overrun or push operation, the rpm of said internal combustion engine is greater than idle rpm.

3. The method of claim 1, wherein said internal combustion engine is coupled force-tight to a drive wheel during overrun or push operation.

4. The method of claim 1, wherein no fuel is supplied to the combustion chamber of said internal combustion engine during said overrun or push operation.

5. The method of claim 1, wherein a check is made as to whether said internal combustion engine is in overrun or push operation.

6. A method for operating an internal combustion engine including an internal combustion engine of a motor vehicle, the method comprising the steps of:
    supplying air and fuel to a combustion chamber of said engine;
    recirculating the exhaust gas into the combustion chamber during overrun or push operation of said internal combustion engine; and
    reducing the air supplied to said combustion chamber during overrun or push operation.
    wherein a check is made as to whether said internal combustion engine is in overrun or push operation, and
    wherein a check is made as to whether the temperature of a catalytic converter of said internal combustion engine is less than a lower temperature of an operating range of the catalytic converter.

7. The method of claim 6, wherein the exhaust gas is only recirculated to said combustion chamber when said overrun or push operation is present and when the temperature of said catalytic converter is less than the lower temperature.

8. The method of claim 7, wherein the air supplied to said combustion chamber is only then reduced when said overrun or push operation is present and when the temperature of said catalytic converter is less than said lower temperature.

9. A computer program comprising a program suitable for carrying out a method for operating an internal combustion engine when executed on a computer, the method including the steps of:
    (a) providing a catalytic converter which receives exhaust gases from said combustion engine;
    (b) supplying air and fuel to a combustion chamber of said engine;
    (c) recirculating the exhaust gas into the combustion chamber during overrun or push operation of said internal combustion engine; and
    (d) reducing the air supplied to said combustion chamber during overrun or push operation, so that cooling out of said catalytic converter is substantially reversed or avoided via steps (c) and/or (d).

10. The computer program of claim 9, wherein the computer program is stored on a memory.

11. The computer program of claim 9, wherein the computer program is stored in a flash memory.

12. A control apparatus for operating an internal combustion engine including an internal combustion engine of a motor vehicle having a catalytic converter for receiving exhaust gases from said combustion engine, the control apparatus comprising:

means for supplying air and fuel to a combustion chamber of said engine;

means for recirculating the exhaust gas into the combustion chamber during overrun or push operation of said internal combustion engine; and means for reducing the air supplied to said combustion chamber during overrun or rush operation, so that cooling out of said catalytic converter is substantially reversed or avoided via said means for recirculating the exhaust gas and/or the means for reducing the air supplied to said combustion chamber.

13. An internal combustion engine including an internal combustion engine of a motor vehicle, the internal combustion engine comprising:

means for supplying air and fuel to a combustion chamber of said engine means for providing exhaust gases from said engine to a catalytic converter; and, a control apparatus including: means for controlling the supply of said air and fuel to said combustion chamber; means for controlling the recirculation of exhaust gas into said combustion chamber during overrun operation; and, means for reducing the air supplied to said combustion chamber during said overrun operation, wherein said control apparatus reverses or avoids cooling off of said catalytic converter.

14. A method for operating an internal combustion engine including an internal combustion engine of a motor vehicle, the method comprising the steps of:

supplying air and fuel to a combustion chamber of said engine;

recirculating the exhaust gas into the combustion chamber during overrun or push operation of said internal combustion engine;

reducing the air supplied to said combustion chamber during overrun or push operation; and wherein a check is made as to whether the temperature of a catalytic converter of said internal combustion engine is less than a lower temperature of an operating range of the catalytic converter.

\* \* \* \* \*

UNITED STATES PATENT AND TRADEMARK OFFICE
CERTIFICATE OF CORRECTION

PATENT NO. : 6,910,470 B2
DATED : June 28, 2005
INVENTOR(S) : Andreas Blumenstock and Klaus Ries-Mueller It is certified that error appears in the above-identified patent and that said Letters Patent is hereby corrected as shown below:

Column 6,
Line 34, delete "operation" and substitute -- operation, -- therefor.

Column 7,
Line 12, delete "rush" and substitute -- push -- therefor.

Signed and Sealed this

Twenty-third Day of August, 2005

JON W. DUDAS
*Director of the United States Patent and Trademark Office*